(12) United States Patent
Huang et al.

(10) Patent No.: US 11,747,766 B2
(45) Date of Patent: Sep. 5, 2023

(54) SYSTEM AND METHOD FOR NEAR-EYE LIGHT FIELD RENDERING FOR WIDE FIELD OF VIEW INTERACTIVE THREE-DIMENSIONAL COMPUTER GRAPHICS

(71) Applicant: NVIDIA Corporation, Santa Clara, CA (US)

(72) Inventors: Fu-Chung Huang, Cupertino, CA (US); Ward Lopes, Redwood City, CA (US); Liang Shi, Cambridge, MA (US)

(73) Assignee: NVIDIA Corporation, Santa Clara, CA (US)

( * ) Notice: Subject to any disclaimer, the term of this patent is extended or adjusted under 35 U.S.C. 154(b) by 406 days.

(21) Appl. No.: 17/189,960

(22) Filed: Mar. 2, 2021

(65) Prior Publication Data
US 2021/0181674 A1 Jun. 17, 2021

Related U.S. Application Data
(63) Continuation of application No. 15/946,576, filed on Apr. 5, 2018, now Pat. No. 10,969,740.
(Continued)

(51) Int. Cl.
*G03H 1/02* (2006.01)
*G03H 1/08* (2006.01)
(Continued)

(52) U.S. Cl.
CPC ........... *G03H 1/02* (2013.01); *G02B 27/0172* (2013.01); *G03H 1/0808* (2013.01);
(Continued)

(58) Field of Classification Search
CPC ...... G03H 1/02; G03H 1/0808; G03H 1/2294; G03H 1/0841; G03H 1/0866;
(Continued)

(56) References Cited

U.S. PATENT DOCUMENTS 6,437,782 B1 8/2002 Pieragostini et al.
6,703,989 B1 3/2004 Harrold et al.
(Continued)

FOREIGN PATENT DOCUMENTS

CN 104427325 A 3/2015
CN 104036539 B 1/2017
(Continued)

OTHER PUBLICATIONS

Kinjo et al., "Two micron pixel pitch magneto-optical spatial light modulator," Magnetics Conference (INTERMAG) 2017 IEEE International, Aug. 2018, pp. 1.
(Continued)

*Primary Examiner* — Derek S. Chapel
(74) *Attorney, Agent, or Firm* — Leydig, Voit & Mayer, Ltd.

(57) ABSTRACT

A method for rendering a light field comprises projecting rays from a viewpoint positioned at a first side of a spatial light modulator (SLM) to a clipping plane positioned at an opposing side of the SLM to form an elemental view frustum within a three-dimensional scene and rendering objects within the elemental view frustum to generate components of a first elemental image for the first elemental region. The SLM may include a tiled array of non-overlapping elemental regions and a top edge and a bottom edge of a first elemental region of the non-overlapping elemental regions are intersected by the rays to form the elemental view frustum. Furthermore, the light field may include the first elemental image and additional elemental images corresponding to the array of elemental regions and each one of the additional elemental images is rendered using an additional elemental view frustum.

20 Claims, 19 Drawing Sheets

Related U.S. Application Data

(60) Provisional application No. 62/525,644, filed on Jun. 27, 2017.

(51) Int. Cl.
*G03H 1/22* (2006.01)
*G02B 27/01* (2006.01)

(52) U.S. Cl.
CPC ... *G03H 1/2294* (2013.01); *G02B 2027/0123* (2013.01); *G02B 2027/0174* (2013.01); *G03H 2001/0224* (2013.01); *G03H 2210/36* (2013.01); *G03H 2210/45* (2013.01)

(58) Field of Classification Search
CPC .............. G03H 1/0891; G03H 1/2286; G03H 27/0172; G03H 2210/45–454; G03H 2210/36; G03H 2001/0224; G03H 2001/0858; G03H 2001/0875; G03H 2001/0883; G03H 2001/2236; G03H 2001/2263; G03H 2027/0123; G03H 2027/0174; G03H 2027/0147; G02B 27/0172

See application file for complete search history.

(56) References Cited

U.S. PATENT DOCUMENTS

| | | |
|---|---|---|
| 7,167,181 B2 | 1/2007 | Duluk, Jr. et al. |
| 7,236,169 B2 | 6/2007 | Barone et al. |
| 7,643,025 B2 | 1/2010 | Lange |
| 8,149,265 B2 | 4/2012 | Smalley et al. |
| 8,154,546 B2 | 4/2012 | Loop |
| 8,212,841 B2 | 7/2012 | Clodfelter |
| 8,269,691 B2 | 9/2012 | Watson |
| 8,411,087 B2 | 4/2013 | Wei et al. |
| 8,416,479 B2 | 4/2013 | Kroll et al. |
| 8,498,053 B2 | 7/2013 | Futterer et al. |
| 8,526,088 B2 | 9/2013 | Schwerdtner et al. |
| 8,917,441 B2 | 12/2014 | Woodgate et al. |
| 8,941,902 B2 | 1/2015 | Schwerdtner |
| 9,019,261 B2 | 4/2015 | Ohta |
| 9,336,624 B2 | 5/2016 | Sullivan et al. |
| 9,704,299 B2 | 7/2017 | Mitchell |
| 9,740,167 B2 | 8/2017 | Leister et al. |
| 2008/0225048 A1 | 9/2008 | Bijankumar et al. |
| 2011/0102425 A1 | 5/2011 | Ohta |
| 2014/0055692 A1 | 2/2014 | Kroll et al. |
| 2014/0340390 A1* | 11/2014 | Lanman .............. G02B 27/017 345/589 |
| 2015/0277378 A1* | 10/2015 | Smithwick ........... G03H 1/0808 359/9 |
| 2015/0287158 A1 | 10/2015 | Cerny et al. |
| 2016/0203635 A1 | 7/2016 | Wyman et al. |
| 2016/0307482 A1 | 10/2016 | Huang et al. |
| 2016/0327906 A1 | 11/2016 | Futterer |
| 2016/0349702 A1 | 12/2016 | Sung et al. |
| 2017/0154460 A1 | 6/2017 | Hu |
| 2019/0121291 A1* | 4/2019 | Leister ................. G03H 1/2294 |

FOREIGN PATENT DOCUMENTS

| | | |
|---|---|---|
| KR | 20160126902 A | 11/2016 |
| KR | 20170067325 A | 6/2017 |
| WO | WO 2015123775 A1 | 8/2015 |
| WO | WO 2017149064 A1 | 9/2017 |

OTHER PUBLICATIONS

Huang et al., "The Light Field Stereoscope: Immersive Computer Graphics via Factored Near-Eye Light Field Displays with Focus Cues," ACM Trans. Graph., vol. 34, No. 4, Article 60, Jul. 2015, pp. 1-12.

Jia et al., "Fast and effective occlusion culling for 3D holographic displays by inverse orthographic projection with low angular sampling," Applied Optics, vol. 53, No. 27, 2014, pp. 6287-6293.

Maimone et al., "Holographic near-eye displays for virtual and augmented reality," ACM Transactions on Graphics (TOG), vol. 36, No. 4, 2017, pp. 85:1-85:16.

Qu et al., "Image magnification in lensless holographic projection using double-sampling Fresnel diffraction," Applied optics, vol. 54, No. 34, Dec. 2015, pp. 10018-10021.

Reichelt et al., "Full-range, complex spatial light modulator for real-time holography," Optics letters, vol. 37, No. 11, 2012, pp. 1955-1957.

Sato et al., "Calculation method for reconstruction at arbitrary depth CGH with Fourier transform optical system," Practical Holography XXVI: Materials and Applications, vol. 8281, International Society for Optics and Photonics, 2012, pp. 82810W-1-82810W-8.

Wakunami et al., "Occlusion culling for computer generated hologram based on ray-wavefront conversion," Optics Express, vol. 21, No. 19, 2013, pp. 21811-21822.

Zhang et al., "Fully computed holographic stereogram based algorithm for computer-generated holograms with accurate depth cues," Optics express, vol. 23, No. 4, 2015, pp. 3901-3913.

Reichelt et al., "Holographic 3-D Displays—Electro-holography within the Grasp of Commercialization," Advances in Lasers and Electro Optics, Apr. 2010, pp. 683-710.

Kozacki, T., "Holographic display with tilted spatial light modulator," Applied Optics, vol. 50, No. 20, Jul. 10, 2011, pp. 3579-3588.

Lucente, M., "Interactive three-dimensional holographic displays: seeing the future in depth," Siggraph's "Computer Graphics" publication on "Current, New and Emerging Display Systems," May 1997, pp. 1-17.

Yao et al., "Uniform Luminance Light Field Near Eye Display using Pinhole Arrays and Gradual Virtual Apertures," 2016 International Conference on Virtual Reality and Visualization, Sep. 2016, pp. 402-406.

Fernandes, A.R., "View Frustum Culling Tutorial," Lighthouse 3D, 2006, pp. 1-32, as retrieved from http://cqvr.informatlk.uni-bremen.de/teaching/cg_literatur/lighouse3d_view_frustum_culling/index.html.

Kora et al., "Efficient View Frustum Culling," Department of Computer Science Faculty of Electrical Engineering, Czech Technical University, 2002, pp. 1-11, as retrieved from http://old.cescg.org/CESCG-2002/DSykoraJJelinek/.

U.S. Appl. No. 15/946,576, filed Apr. 5, 2018.

\* cited by examiner

1: $i \leftarrow pixel\ index\ in\ SLM$
2: $\phi_{E_R^*(x)} \leftarrow length\left(\left|\left(i - \frac{P_{w_s}}{2}\right) \cdot \Delta p, D_F\right|\right)/\lambda \cdot 2\pi$
3: $i_{Hogel} \leftarrow mod(i, P_{w_h})$
4: $i_{Elem} \leftarrow \lfloor i/P_{w_h} \rfloor \cdot P_{w_1} + i_{Hogel}/P_{w_h} \cdot (P_{w_1} - P_{w_2})$
5: for $Pixel\ index\ in\ sliding\ window\ j = 0\ to\ P_{w_2} \times P_{w_2}$ do
6:    $q \leftarrow LightFieldPositionTex[i_{Elem} + j]$
7:    $\Delta q \leftarrow \left\{\left(i - \frac{P_{w_h}}{2}\right) * \Delta p + d_{c_{(x,y)}}, -d_{c_z}\right\}$
8:    $\phi \leftarrow Length(q - \Delta q)/\lambda \cdot 2\pi + \phi_{E_R^*(x)} + \phi_{Init}$
9:    $A \leftarrow LightFieldColorTex[i_{Elem} + j] \cdot (1/r)$
10:    if Angle < MaxDiffractionAngle then
11:      $\mathbb{E}(i) \leftarrow \mathbb{E}(i) + A \cdot e^{i\phi}$
12:    end if
13: end for

*Fig. 2F*

SYSTEM AND METHOD FOR NEAR-EYE LIGHT FIELD RENDERING FOR WIDE FIELD OF VIEW INTERACTIVE THREE-DIMENSIONAL COMPUTER GRAPHICS

CLAIM OF PRIORITY

This application is a continuation of U.S. Non-Provisional application Ser. No. 15/946,576, filed on Apr. 5, 2018, which claims the benefit of U.S. Provisional Application No. 62/525,644 titled "NEAR-EYE LIGHT FIELD HOLOGRAPHIC RENDERING," filed Jun. 27, 2017, the entire contents of which are incorporated herein by reference.

FIELD OF THE INVENTION

The present invention relates to computer generated holography, and more particularly to a system and method for near-eye light field rendering for wide field of view interactive three-dimensional computer graphics.

BACKGROUND

Creating a comfortable visual experience is important to the success of modern virtual reality (VR) and augmented reality (AR) systems. A wide field of view, high resolution, interactivity, view-dependent occlusion, and continuous focus cues are significant features for providing a comfortable visual experience. However, conventional VR systems typically fail to provide many of these features, resulting in user discomfort. Thus, there is a need for addressing these issues and/or other issues associated with the prior art.

SUMMARY

A method, computer readable medium, and system are configured to render a light field. The method comprises projecting rays from a viewpoint positioned at a first side of a spatial light modulator (SLM) to a clipping plane positioned at an opposing side of the SLM to form an elemental view frustum within a three-dimensional scene. Objects within the elemental view frustum are rendered to generate components of a first elemental image for the first elemental region. In one embodiment, the SLM is tiled with an array of elemental regions and a top edge and a bottom edge of a first elemental region of the non-overlapping elemental regions are intersected by the rays to form the elemental view frustum. In certain embodiments, the light field includes the first elemental image and additional elemental images corresponding to the array of elemental regions and each one of the additional elemental images is rendered using an additional elemental view frustum.

The computer readable medium includes instructions that, when executed by a processing unit, perform the method. Furthermore, the system includes circuitry configured to perform the method.

A second method, second computer readable medium, and second system are configured to render a light field. The second method comprises computing a lateral offset between a view position and a spatial light modulator (SLM) based on a size of the SLM and a width of a holographic element. A three-dimensional scene is rendered from the view position to produce an array of elemental images. In one embodiment, an array of holographic elements covers a surface of the SLM.

The second computer readable medium includes instructions that, when executed by a processing unit, perform the second method. Furthermore, the second system includes circuitry configured to perform the second method.

BRIEF DESCRIPTION OF THE DRAWINGS

FIG. 2F illustrates algorithmic operations of a method for rendering a light field using spherical illumination, in accordance with one embodiment.

DETAILED DESCRIPTION

Embodiments of the present invention improve field of view, interactivity at high resolution, and view dependent occlusion in computer generated holography (CGH). Furthermore, various embodiments advantageously provide continuous focus cues, thereby substantially avoiding vergence-accommodation-conflict in near eye displays. In one embodiment, a near eye display comprises liquid crystal (LC) and/or spatial light modulator (SLM) structures configured to display a CGH light field to a user. The CGH light field may be computed according to plane wave illumination, spherical wave illumination, or any other technically feasible wave propagation illumination model.

A CGH light field provides an object wave for a given observable point in a three-dimensional (3D) scene, based on a reference wave. The form of the reference wave (e.g., plane wave) may be specified, and CGH processing computes a diffraction pattern which will perform a conversion from the reference wave to an object wave at a given location within a hologram. In one embodiment, computing the object wave includes projecting rays from a viewpoint (e.g., rendering camera position) positioned in front of an SLM towards a clipping plane positioned in back of the SLM. In general, the viewpoint and the clipping plane may be positioned on opposing sides of the SLM. A given ray may be computed to have an amplitude and phase relative to other rays. Regions of the SLM may be organized into elemental images, each with an elemental view frustum within the 3D scene so that each elemental image may comprise a single, different representative view of the 3D scene. Furthermore, multiple elemental images may be rendered to form a complete 3D scene presented to a user.

Figure 1A:
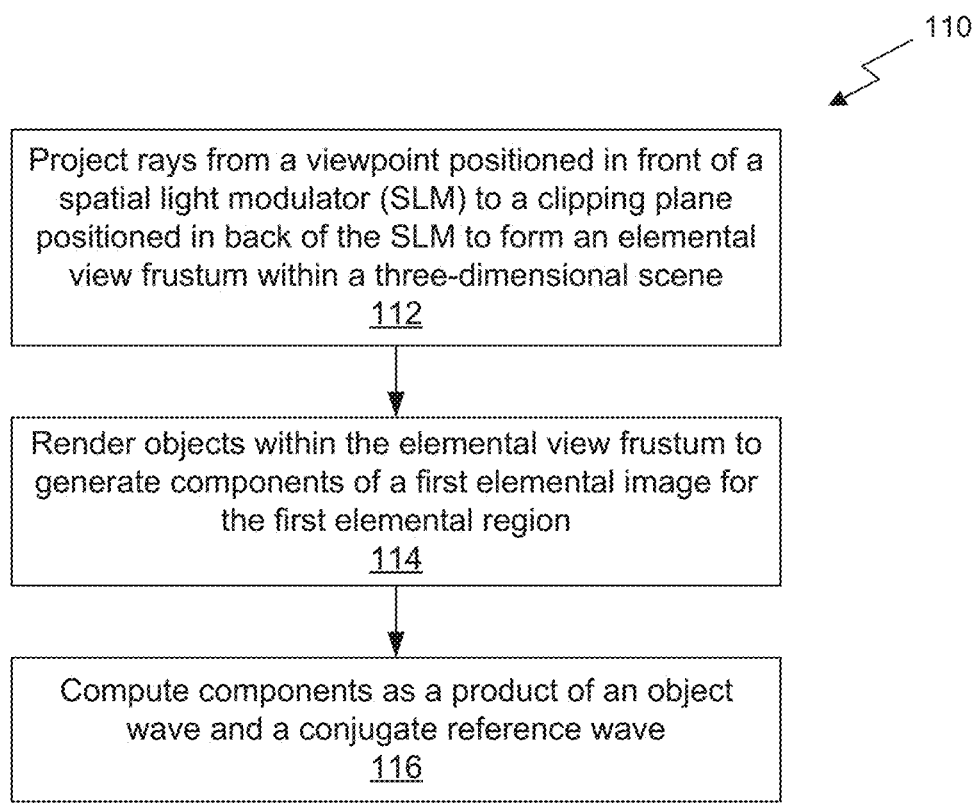
FIG. 1A illustrates a flowchart of a method for rendering a light field, in accordance with one embodiment.

FIG. 1A illustrates a flowchart of a method 110 for rendering a light field, in accordance with one embodiment. Although method 110 is described in the context of a processing unit, the method 110 may also be performed by a program, custom circuitry, or by a combination of custom circuitry and a program. For example, the method 110 may be executed by a GPU (graphics processing unit), a CPU (central processing unit), or any other technically feasible processor. Furthermore, persons of ordinary skill in the art will understand that any system that performs method 110 is within the scope and spirit of embodiments of the present invention.

At step 112, the processing unit projects rays from a viewpoint positioned in front of an SLM to a clipping plane positioned in back of the SLM to form an elemental view frustum within a 3D scene. More generally, the viewpoint may be positioned at a first side of the SLM, and the clipping plane may be positioned at an opposing side of the SLM. In one embodiment, viewpoint is positioned on the observer's side of the SLM and the near clipping plane is positioned on the opposing side (opposite side relative to the observer) of the SLM. In one embodiment, the near clipping plane is located coincident with the surface of the SLM. In one embodiment, the SLM is tiled with an array of non-overlapping elemental regions and a top edge and a bottom edge of a first elemental region of the non-overlapping elemental regions are intersected by the rays to form the elemental view frustum.

At step 114, the processing unit renders objects within the elemental view frustum to generate components of a first elemental image for the first elemental region. In one embodiment, the light field includes the first elemental image and additional elemental images corresponding to the array of elemental regions and each one of the additional elemental images is rendered using an additional elemental view frustum.

At step 116, the processing unit computes phase and amplitude components for driving the SLM as a product of an object wave and a conjugate reference wave. Furthermore, the components may include color and position within the 3D scene. In one embodiment, the conjugate reference wave comprises a plane wave illumination source. In another embodiment, the conjugate reference wave comprises a spherical wave illumination source. In other embodiments, the conjugate reference wave comprises an arbitrary illumination source.

In one embodiment, for each pixel of the SLM within the first elemental region, rendering comprises projecting second rays from the pixel of the SLM to the clipping plane to define a pixel diffraction cone having a base of a first width and removing a portion of the components of the first elemental image that are outside of the pixel diffraction cone to perform ambiguity segment culling.

Figure 1B:
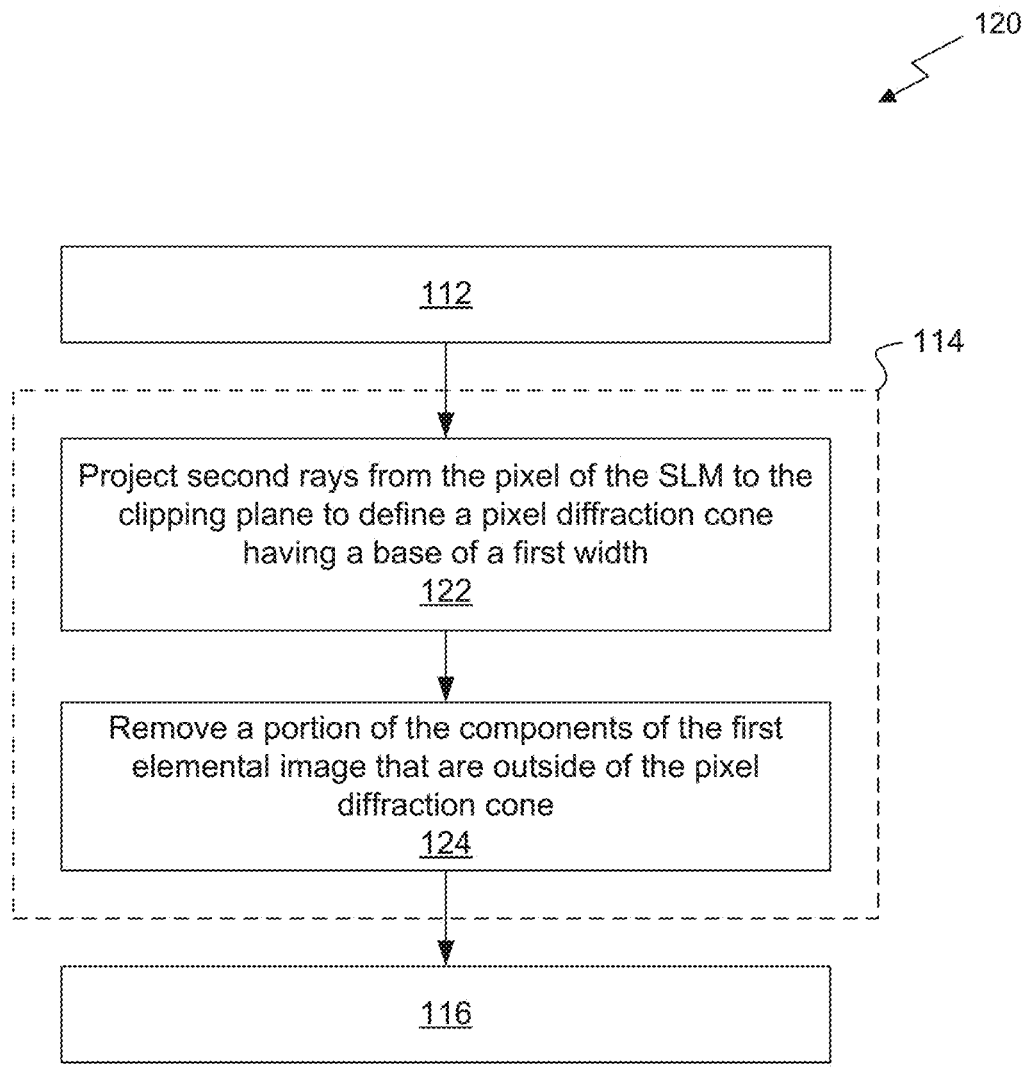
FIG. 1B illustrates a flowchart of a method for rendering objects within an elemental view frustum, in accordance with one embodiment.

FIG. 1B illustrates a flowchart of a method 120 for rendering objects within the elemental view frustum, in accordance with one embodiment. Although method 120 is described in the context of a processing unit, the method 120 may also be performed by a program, custom circuitry, or by a combination of custom circuitry and a program. For example, the method 120 may be executed by a GPU, CPU, or any other technically feasible processor. Furthermore, persons of ordinary skill in the art will understand that any system that performs method 120 is within the scope and spirit of embodiments of the present invention. As shown in FIG. 1B, in one embodiment, step 114 of method 110 comprises steps 122 and 124.

At step 122, the processing unit projects second rays from the pixel of the SLM to the clipping plane to define a pixel diffraction cone having a base of a first width. At step 124, the processing unit removes a portion of the components of the first elemental image that are outside of the pixel diffraction cone. In one embodiment, ambiguity segment culling is performed by removing the portion of components outside of the pixel diffraction cone.

Methods 110 and 120 may be performed in the context of computer generated holography (CGH) for generating light field data used to drive an SLM device. A description of CGH will now be set forth, along with implementation details relevant to various embodiments.

Figure 1C:
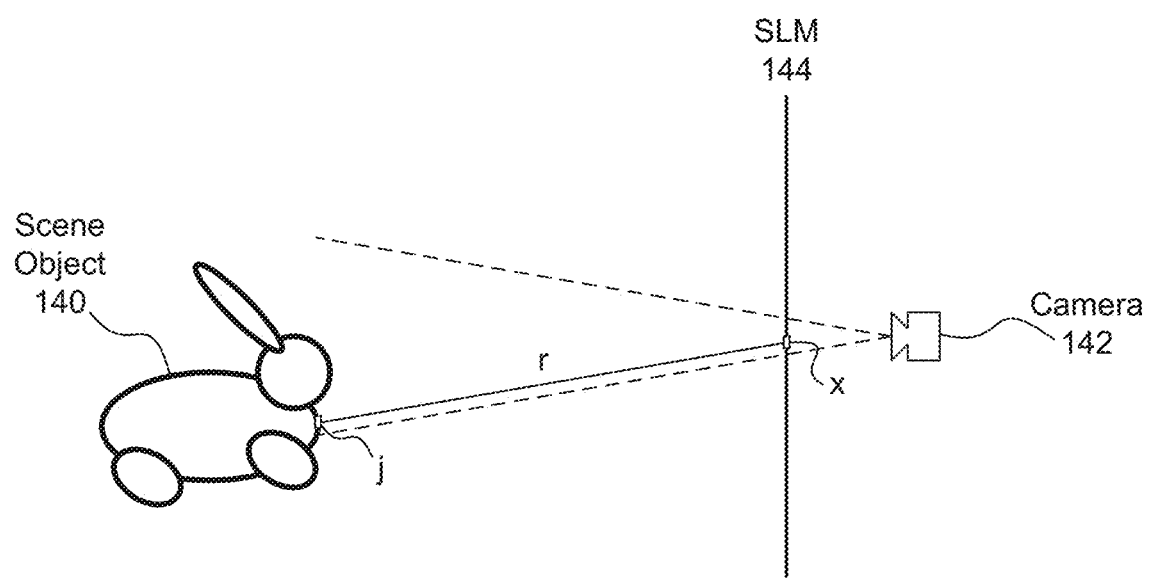
FIG. 1C illustrates computer generated holography, in accordance with one embodiment.

FIG. 1C illustrates computer generated holography (CGH), in accordance with one embodiment. As shown, a rendering viewpoint is indicated by a virtual camera 142, which is positioned to view a scene object 140 through an SLM 144. A point j is shown on the scene object 140, and a distance r separates point j from a pixel location x on the SLM 144.

In general, a hologram converts an input reference light wave $E_R(x)$ to an appropriate output object light wave $E_O(x)$. In CGH, generating the output object light wave requires knowledge of both the reference light wave and the object light wave. The form of the reference light wave may be given and various CGH techniques may be applied to compute a diffraction pattern that will yield the object light wave at each location on SLM 144. A diffraction pattern may be computed for each location based on a desired output waveform for the location on the SLM 144. To compute a given output waveform resulting from scene object 140, light is propagated backwards towards the SLM 144 using a Fresnel diffraction integral. For a scene object 140 comprising discrete points j, a summation of spherical waves originating from the points j may operate in place of a diffraction integral. Such a summation is calculated by Equation 1.

$$E_O(x) = \sum_j \frac{A_j}{r_j(x)} e^{i\left(\frac{2\pi}{\lambda} r_j(x) + \phi_j\right)} \quad (1)$$

In Equation 1, $\lambda$ is the wavelength of a monochromatic light source, $A_j$ is the amplitude of the point j on the scene object 140, and $r_j(x)$ is the Euclidean distance from the point j to a pixel location x on the SLM 144 to a given point j on the scene object 140. Furthermore, $\phi_j$ is a random initial phase associated with each point j.

The resulting electric field $E_O(x)$ is complex-valued. In CGH, a corresponding illumination wavefront is generated by multiplying the resulting electric field with an appropriate illumination field. For example, in plane wave (collimated beam) illumination the resulting electric field is multiplied by a constant (e.g., 1). For spherical wave illumination, the electric field may be multiplied by a complex exponential with a quadratic phase to cancel out the quadratic phase of a spherical reference wave. Displaying a correct diffraction pattern on the SLM 144 is provided by spatially varying both amplitude and phase delays, according to a resulting product.

In one embodiment, a CGH rendering and display pipeline starts with a polygon-based holographic light field rendering and includes a point-based approach (i.e., summation of propagating fields from points on scene object 140) with local partitioning for view-dependent effect. Occlusion is handled through the pipeline using a z-buffer. Sampled fragments allow for parallel full-parallax CGH computation on a GPU at interactive speed with high-resolution (e.g., 1080p) image quality. In certain embodiments, a CGH rendering pipeline includes a polygon surface approach (i.e., summation of propagating fields from visible polygon surfaces comprising scene object 140) that may operate independently or in conjunction with the point-based approach. Any technically feasible technique may be performed to compute fields from the polygon surfaces at different pixels of SLM 144. Furthermore, while various techniques taught herein are described with reference to points on a scene object, persons of ordinary skill in the art will understand that the techniques may be applied to polygons and/or arbitrary shapes or surfaces without departing the scope and spirit of various embodiments.

Rendering a full light field generates highly-overlapped views for adjacent hologram pixels and conventionally results in significant computational redundancy. For example, in a point-based approach, conventional rendering requires sequential scanning of the scene to accumulate wavefronts emitted from depth-sorted scene points. Such an operation is equivalent to adding densely sampled angular views in conventional light field rendering, an approach known in the art to be computationally impractical for real-time graphics.

However, assuming Lambertian surfaces for scene object 140, a single recording of each point is sufficient to determine the wavefront. Leveraging this observation, a hologram can be spatially partitioned into abutting grids, with an individual grid referred to herein as a holographic element (hogel), illustrated in FIG. 1D.

Figure 1D:
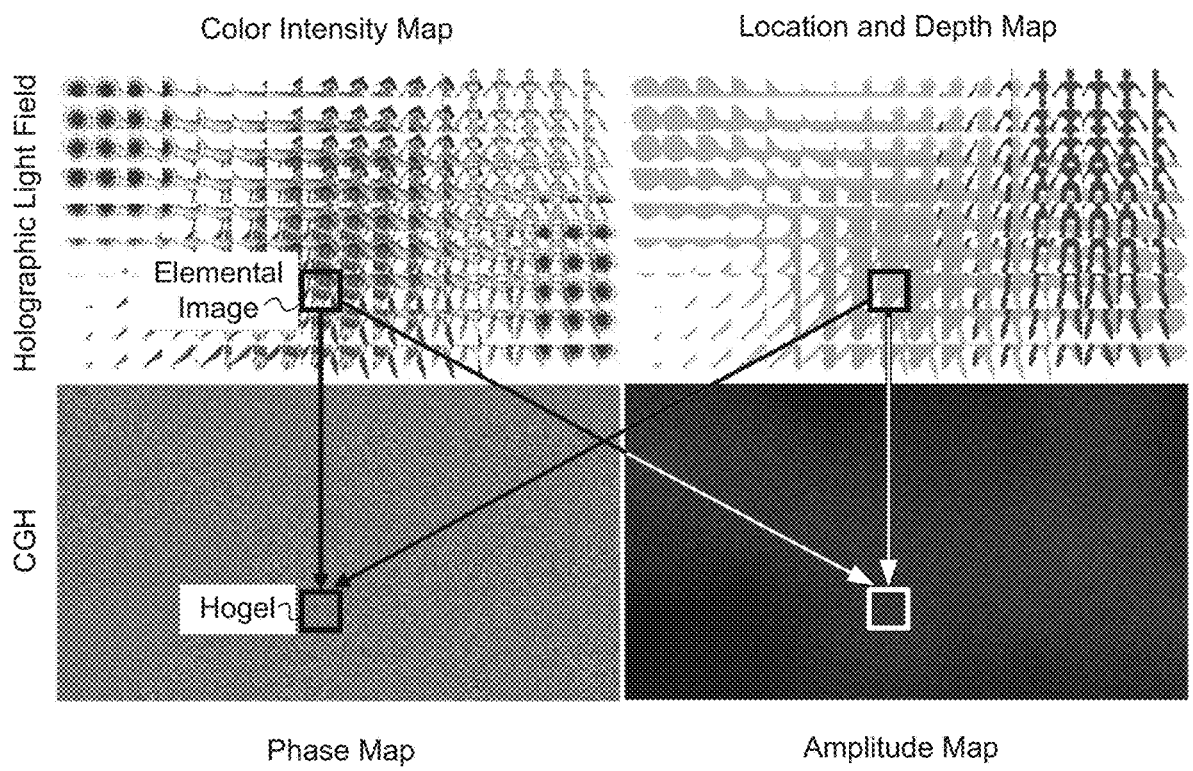
FIG. 1D illustrates a holographic element, in accordance with one embodiment.

FIG. 1D illustrates a holographic element, in accordance with one embodiment. As shown, a color intensity map includes an abutting grid of elemental images. Each elemental image comprises a single representative view of a 3D scene. A location and depth map includes a corresponding grid of depth information for the elemental images. A given elemental image is rendered and used to calculate each hogel, assuming all captured points are visible to all pixels in the hogel. In one embodiment, each hogel has an associated phase map and an associated amplitude map. The phase map and the amplitude map may be computed based on the color intensity map and the location and depth map.

Monocular occlusion parallax is bounded by hogel size ($w_h$) within an eye box. In one embodiment, an eye box is a region at a user's eye position that is sufficiently large as to allow a user's eye to move freely while allowing the user (viewer) to see the entire 3D scene depicted by SLM 144 (e.g., all points on scene object 140). Approximating a complete holographic light field display as a grid of hogels substantially reduces rendering passes and computational effort, allowing conventional GPU systems to support real-time rendering applications. However, conventional hogel rendering projects to a given hogel center, thereby failing to render an accurate per-pixel diffraction cone gathering, and conventional hogel rendering may scale poorly in spherical illumination scenarios.

Figure 2A:
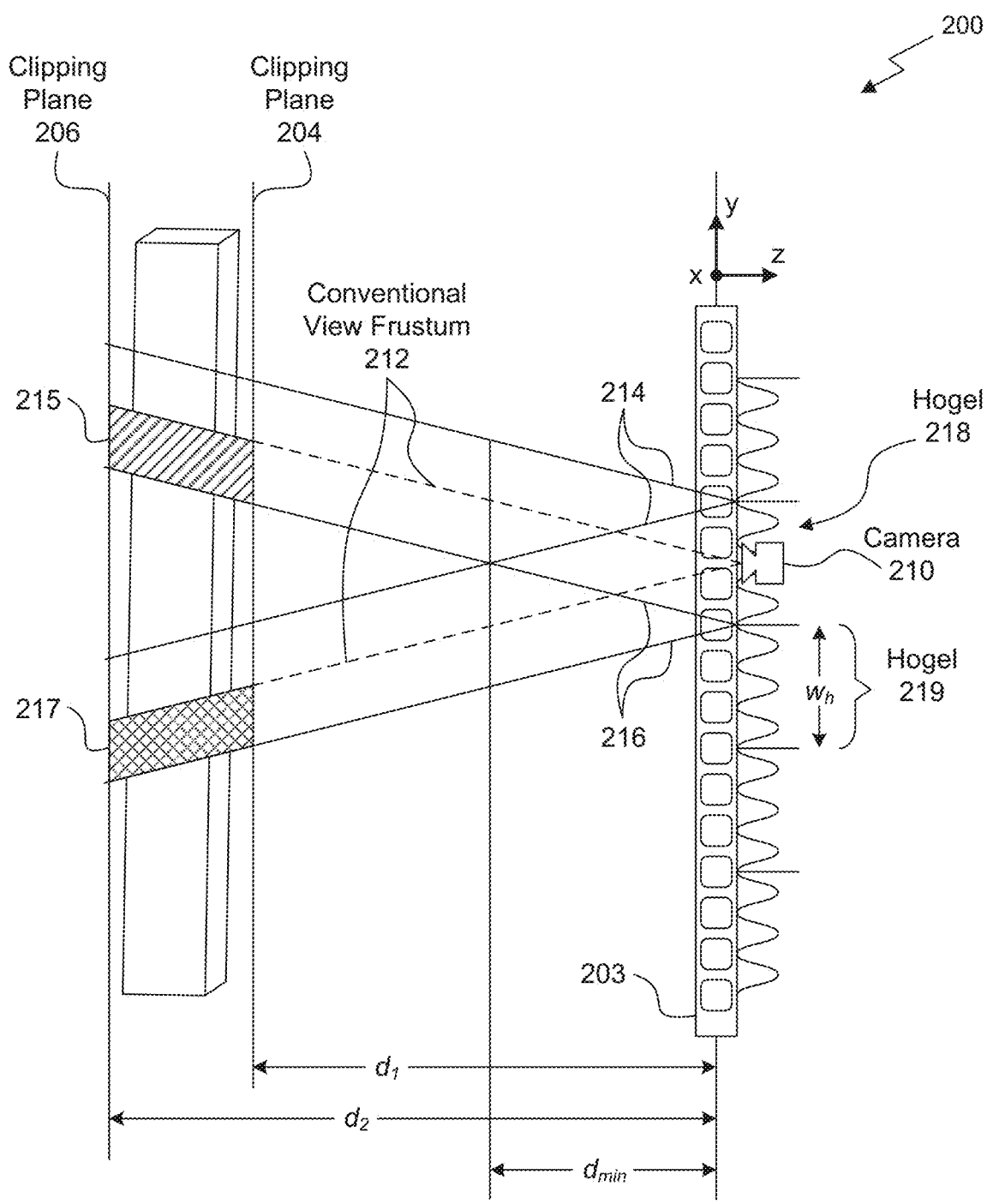
FIG. 2A illustrates conventional hogel rendering, in accordance with the prior art.

FIG. 2A illustrates conventional hogel rendering, in accordance with the prior art. As shown, a rendering configuration 200 includes a virtual camera 210 positioned at the center of a hogel 218 included within an SLM 203. The virtual camera 210 is aimed at a scene to be rendered. The position of virtual camera 210 results in a conventional view frustum 212, which only provides accurate rendering for pixels centered within the hogel 218. In prior art hogel rendering systems, the conventional view frustum 212 is used for rendering all pixels in hogel 218 because virtual camera 210 is statically positioned at the center of the hogel 218. Consequently, for a bottom pixel in the hogel 218, region 215 is mistakenly incorporated into the pixel during rendering, while region 217 will be incorrectly excluded from the pixel during rendering. To accurately render the bottom pixel in hogel 218, view frustum 216 should be used. Similarly, to accurately render the top pixel in hogel 218, view frustum 214 should be used.

As shown, hogels 218, 219 on SLM 203 have a hogel size $w_h$. Furthermore, a near clipping plane 204 is positioned a distance $d_1$ from SLM 203, and a far clipping plane 206 is positioned a distance $d_2$ from SLM 203. Hogel size $w_h$ sets a depth limit of $z \leq d_{min}$ to scene objects and the near clipping plane 204 to prevent geometric clipping. In certain scenarios, this depth limit, along with potential geometric clipping, inaccurate per-pixel diffraction cone gathering, and/or additional limitations of conventional hogel rendering reduce the comfort and quality of a user experience.

Figure 2B:
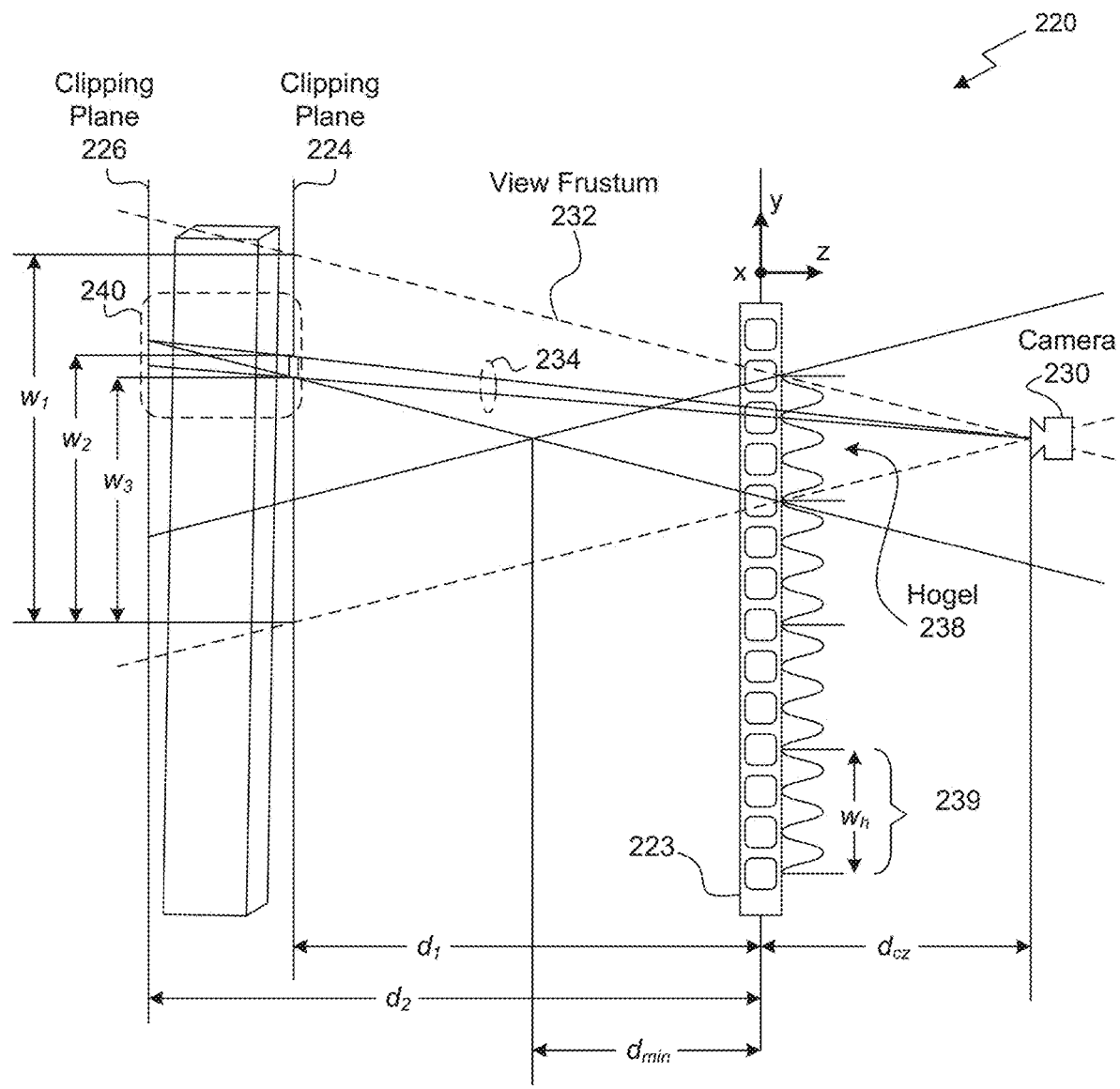
FIG. 2B illustrates hogel rendering with plane wave illumination, in accordance with one embodiment.

FIG. 2B illustrates hogel rendering with plane wave illumination, in accordance with one embodiment. As shown, a rendering configuration 220 includes a virtual camera 230 positioned at a lateral offset $d_{CZ}$ along the Z (depth) axis with respect to an SLM 223. In contrast, with conventional techniques, as shown in FIG. 2A, where the virtual camera 210 is positioned at a lateral offset of zero, the lateral offset $d_{CZ}$ is greater than zero. The virtual camera 230 is aimed at a scene to be rendered, including a near clipping plane 224 and a far clipping plane 226. The position of virtual camera 230 results in a view frustum 232 that intersects at least hogel 238 on SLM 223. Hogels 238, 239 on SLM 223 have a hogel size $w_h$. The near clipping plane 224 is positioned a distance $d_1$ from SLM 223, and the far clipping plane 226 is positioned a distance $d_2$ from SLM 203. The lateral offset $d_{CZ}$ may be equal to a depth limit of $z \leq d_{min}$ relative to scene objects and the near clipping plane 224. In one embodiment, the lateral offset is calculated according to Equation 2:

$$d_{CZ} = d_{min} = \frac{w_h}{2\tan\left(\sin^{-1}\left(\frac{\lambda}{2\Delta p}\right)\right)} \qquad (2)$$

In Equation 2, $\Delta p$ is a pixel pitch size for SLM 223, and $\lambda$ is the wavelength of a monochromatic light source, such as a light source used for rendering. As shown, the offset position of virtual camera 230 allows the entire visible area for view frustum 232 to be rendered. This visible area is indicated by $w_1$, and calculated by Equation 3:

$$w_1 = 2\sin^{-1}(\lambda/2\Delta p)(d_1 + d_{CZ}) \tag{3}$$

In one embodiment, view frustum 232 intersects the edge of hogel 238 and near clipping plane 224, with an extent of $w_1$. Furthermore, each pixel in SLM 223 may be generated using only a valid diffraction cone, bounded by projection 234. A per-pixel perspective may be obtained by aligning the diffraction cone in the far clipping plane 226 with a sliding window, defined by $w_3$. The sliding window ($w_3$) may be calculated according to Equation 4:

$$w_3 = \left(1 - \frac{d_{CZ}}{d_1 + d_{CZ}}\right) w_1 \tag{4}$$

Figure 2C:
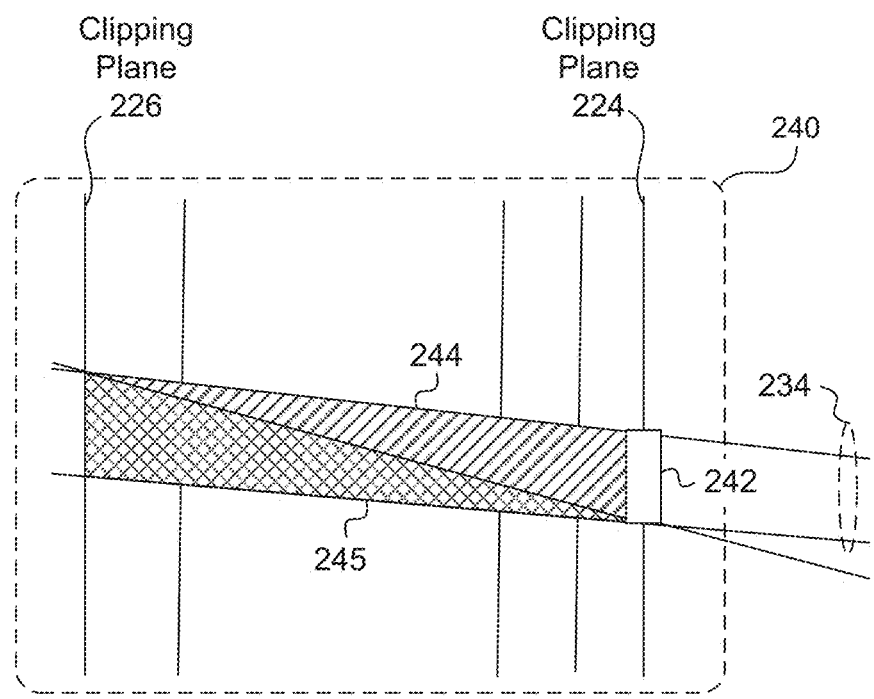
FIG. 2C illustrates a region of an ambiguity segment, in accordance with one embodiment.

Diffraction culling may be used on an ambiguity segment, illustrated in FIG. 2C showing region 240 in detail, to provide more accurate rendering. Diffraction culling may include, without limitation, removing certain covered scene object geometry associated with an ambiguity segment from contributing to a given pixel on SLM 223. The ambiguity region may be obtained by extending the sliding window to $w_2$, as calculated in Equation 5. Furthermore, $w_3$ and $w_2$ bound projection 234.

$$w_2 = \left(1 - \frac{d_{CZ}}{d_2 + d_{CZ}}\right) w_1 \tag{5}$$

Arranging an array of virtual cameras 230 (e.g., one virtual camera per elemental view or elemental region) according to the disclosed configuration allows for unrestricted disposition of scene objects. Lateral offset $d_{CZ}$ ensures adjacent camera views overlap immediately in front of the SLM 223, and a resulting tiled frustum array fully covers the field of view of the entire hologram (the entire 3D scene). This allows the near clipping plane 224 to be advantageously set at an arbitrary depth in front of the SLM 223.

FIG. 2C illustrates a region 240 of an ambiguity segment 242, in accordance with one embodiment. Projection 234 intersects near clipping plane 224 and far clipping plane 226. Projection 234 may define a pixel diffraction cone with a base of a certain width. Furthermore, projection 234 may intersect an included region 245 (within the width) that should be included in rendering an associated pixel on SLM 223, and an excluded region 244 (outside the width) that should be excluded from rendering the pixel. Components outside the pixel diffraction cone may be removed as part of rendering one or more pixels within the pixel diffraction cone.

Figure 2D:
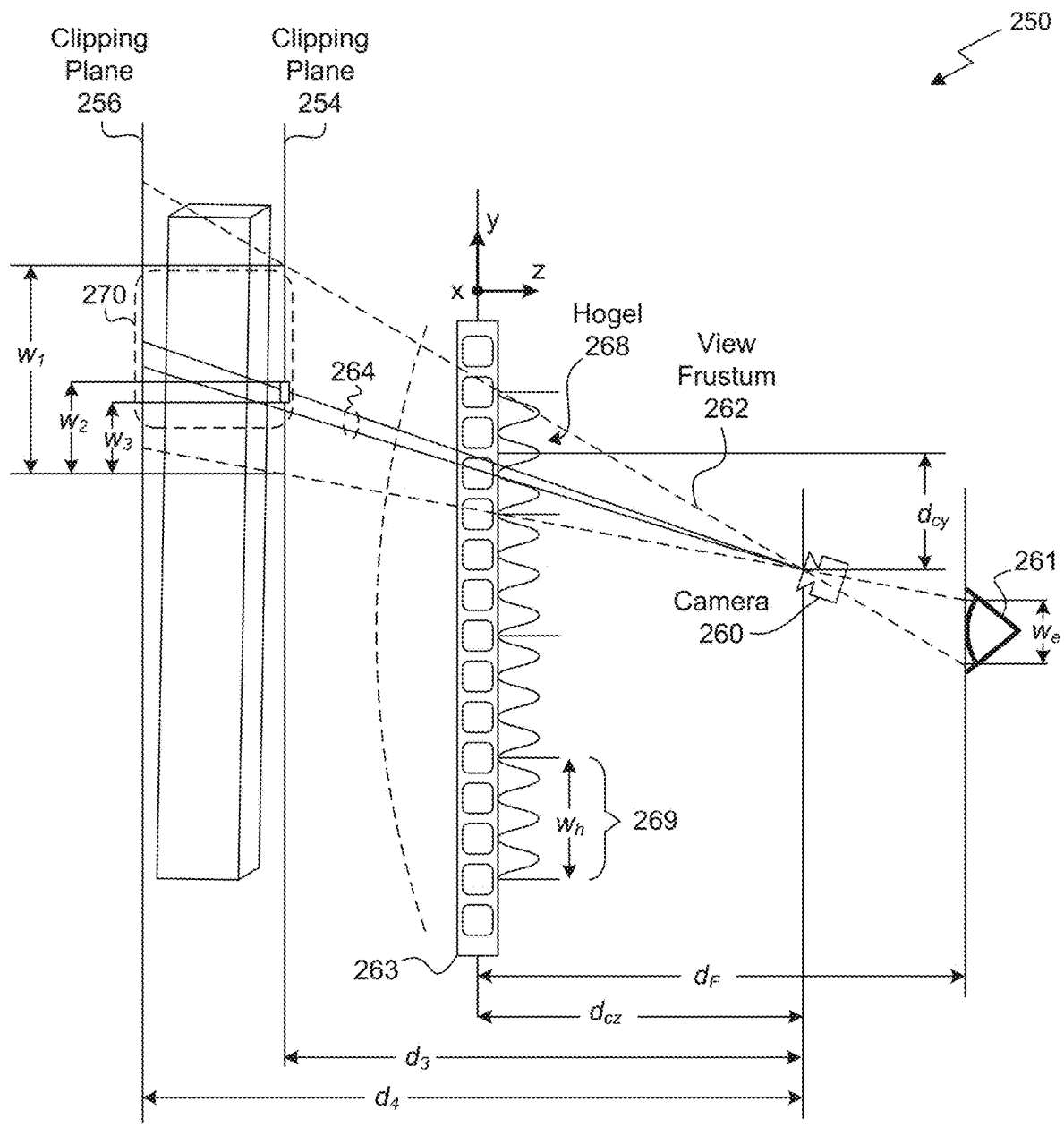
FIG. 2D illustrates hogel rendering with spherical wave illumination, in accordance with one embodiment.

FIG. 2D illustrates hogel rendering with spherical wave illumination, in accordance with one embodiment. As shown, a rendering configuration 250 includes a virtual camera 260 positioned at a lateral offset $d_{CZ}$ along the Z (depth) axis with respect to an SLM 263. The virtual camera 260 is aimed at a scene to be rendered, including a near clipping plane 254 and a far clipping plane 256. The position of virtual camera 260 results in a view frustum 262 that intersects at least hogel 268 on SLM 263. Hogels 268, 269 on SLM 263 have a hogel size $w_h$. The near clipping plane 254 is positioned a distance $d_3$ along the Z axis from virtual camera 260, and the far clipping plane 256 is positioned a distance $d_4$ along the Z axis from virtual camera 260. A user eye 261 is positioned a distance $d_F$ along the Z axis from SLM 263. As shown, an eye box is shown to be we in size. In one embodiment, a projection of view frustum 262 through virtual camera 260 is at least as large as the eye box.

In various embodiments that implement spherical illumination, view frustum 262 (and other view frustums associated with an array of virtual cameras or camera positions) may undergo a spatially varying transform because spherical illumination wavefronts introduce curvature and an off-axis rotation to a local incident ray direction of a diffraction cone for a given position of virtual camera 260. Such diffraction cones collectively widen the field of view of a given hogel. Extending the rendering configuration 220 of FIG. 2C, to rendering configuration 250 for spherical illumination sets virtual camera 260 at the intersection of marginal rays restricted by the eye box and skews available field of view. In one embodiment, the lateral offset $d_{CZ}$ of virtual camera 260 relative to the position of SLM 263 is given by Equation 6:

$$d_{CZ} = \frac{d_F w_h}{w_e(d_F) + w_h} \tag{6}$$

An offset between a center view of virtual camera 260 and a hogel center along the X-axis and Y-axis depends on the position of the hogel relative to the eye box. Assuming 2m+1 by 2n+1 partitioning of the SLM 263 along the X-axis and Y-axis, respectively, the displacement from an (m, n)-th hogel center to a corresponding virtual camera is given by Equations 7 and 8:

$$d_{CX} = \frac{m w_h d_{CZ}}{d_F} \tag{7}$$

$$d_{CY} = \frac{n w_h d_{CZ}}{d_F} \tag{8}$$

As shown, displacement $d_{CY}$ is a displacement along the Y-axis from the center of hogel 268 to the center of view for virtual camera 260. In camera space, an appropriate off-axis projection matrix is defined by Equation 9:

$$P_{[m,n]} = \begin{bmatrix} \frac{2d_{CZ}}{w_h} & 0 & \frac{2d_{CX}}{w_h} & 0 \\ 0 & \frac{2d_{CZ}}{w_h} & \frac{2d_{CY}}{w_h} & 0 \\ 0 & 0 & -\frac{d_4 + d_3}{d_4 - d_3} & -\frac{2d_4 d_3}{d_4 - d_3} \\ 0 & 0 & -1 & 0 \end{bmatrix} \tag{9}$$

A sliding window $w_2$ inside each elemental image may be used to disambiguate a projected pixel, wherein $w_2$ is calculated according to Equation 10:

$$w_2 = \left(1 - \frac{d_{CZ}(d_4 + d_F - d_{CZ})}{d_4 d_F}\right) w_1 \tag{10}$$

Figure 2E:
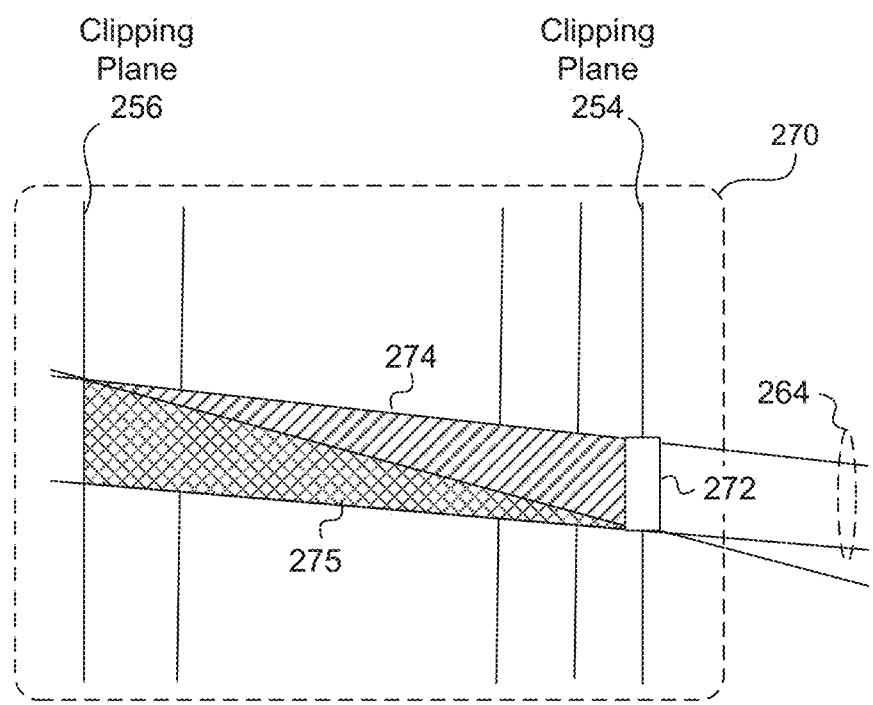
FIG. 2E illustrates a region of an ambiguity segment, in accordance with one embodiment.

Diffraction culling may be used on an ambiguity segment, illustrated in FIG. 2E showing detail of region 270, to provide more accurate rendering. Diffraction culling may include, without limitation, removing certain covered scene object geometry associated with an ambiguity segment from contributing to a given pixel on SLM 263.

A fraction of an error-free segment within the sliding window may be used to derive a hogel size required to obtain an acceptable sampling error. Equation 11:

$$\frac{w_3}{w_2} = 1 - \frac{(d_4 - d_3)d_{CZ}}{d_3(d_4 - d_{CZ})} \tag{11}$$

Hogel size can have a significant impact on visual quality as well as computational effort. In one extreme case of hogel size, a hogel is one pixel within the SLM 263. In this first case, the holographic light field rendering expands to full light field rendering, which may be impractical. In another extreme case of hogel size, a hogel extends to the entire size of the SLM 263. In this second case, the rendered light field recedes to a single map of points rendered from the nearest distance where the SLM 263 is fully observable to a viewer (e.g., a user). In a practical scenario, hogel size is selected between these two extremes, as discussed further in conjunction with FIG. 2G.

In a holographic light field, a one-to-one mapping between a hogel on an SLM and a corresponding visible elemental image, as shown in FIG. 1D, facilitates parallel computation using a point-based method for Fresnel integration (i.e., summation). For example, light field calculation may proceed as a parallel operation on pixels comprising a hogel, a parallel operation on different virtual camera views, or a combination thereof. Furthermore, a parallel operation on pixels may include parallel computation of summation terms comprising Fresnel integration/summation. In one embodiment, a parallel processing unit, such as the PPU 300 shown in FIG. 3 may be used to perform the parallel computations.

FIG. 2E illustrates a region 270 of an ambiguity segment 272, in accordance with one embodiment. Projection 264 intersects near clipping plane 254 and far clipping plane 256. Projection 264 may define a pixel diffraction cone with a base of a certain width. Furthermore, projection 264 may intersect an included region 275 (within the width) that should be included in rendering an associated pixel on SLM 263, and an excluded region 274 (outside the width) that should be excluded from rendering the pixel. Components outside the pixel diffraction cone may be removed as part of rendering one or more pixels within the pixel diffraction cone.

FIG. 2F illustrates algorithmic operations of a method for rendering a light field using spherical illumination, in accordance with one embodiment. In the algorithmic operations, p denotes an SLM pixel in the (m, n)-th hogel, at a displacement ($\Delta x$, $\Delta y$) to the hogel center. A CGH fringe calculation for E(p) of each SLM pixel under spherical illumination multiplies the object wave $E_O(p)$ by a conjugate reference wave $E_R^*(p)$. A position q is located on a scene object to be rendered, the position being identified by an index j. In an associated virtual camera space under spherical illumination, p's spatial coordinate is given by ($\Delta x + d_{CX}$, $\Delta y + d_{CY}$, $-d_{CZ}$). In one embodiment, p's estimated view is a sliding window of k×k pixels. Furthermore, $q_j$ is the elemental pixel with a rendered point located at ($x_{q_j}$, $y_{q_j}$, $z_{q_j}$), an amplitude $A_{q_j}$, and an initial phase $\phi_{q_j}$. This computation is based on Equation 1, and is shown in detail in Equations 12-16.

$$E(p) = E_O(p) \cdot E_R^*(p) \tag{12}$$

In Equation 12, $E_O(p)$ may be calculated according to Equation 13:

$$E_o(p) = \left( \sum_{j=1}^{k^2} \frac{A_{q_j}}{r(p, q_j)} e^{i2\pi \frac{r(p, q_j)}{\lambda} + \phi_{q_j}} \right) \tag{13}$$

Furthermore, $E_R^*(p)$ may be calculated according to Equation 14:

$$E_R^*(p) = \left( \frac{A_F}{r(p, F)} e^{i2\pi \frac{r(p, F)}{\lambda}} \right) \tag{14}$$

Euclidean distances $r(p, q_j)$ and $r(p, F)$ may be calculated according to Equations 15 and 16, respectively:

$$r(p, q_j) = \sqrt{(x_{q_j} - \Delta x - d_{CX})^2 + (y_{q_j} - \Delta y - d_{CY})^2 + (z_{q_j} + d_{CZ})^2} \tag{15}$$

$$r(p, F) = \sqrt{(d_F)^2 + (mw_h + \Delta x)^2 + (nw_h + \Delta y)^2} \tag{16}$$

In steps 1-4 of FIG. 2F, i is defined as a pixel index for a pixel within an SLM (e.g., SLM 263), and a subset of pixels are identified as being within a hogel. Pixels within a sliding window for the hogel are given an index j. A for loop in step 5 is configured to iterate over pixels within the sliding window to compute a field value for each pixel. A wavefront phase ($\phi$) from a point q to a pixel within the SLM is computed in step 8, while an amplitude (A) for the wave front is computed in step 9. Field summation of Equation 12 is completed in step 11.

Figure 2G:
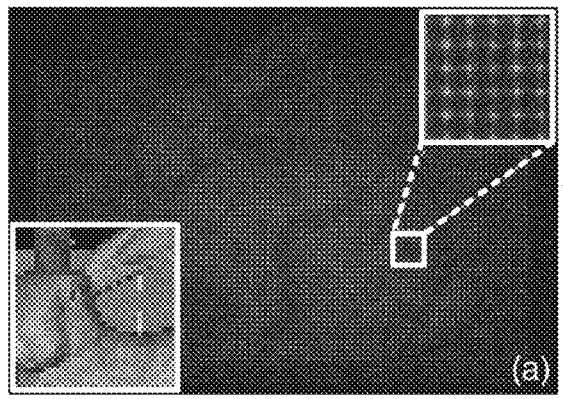
FIG. 2G illustrates a comparison of elemental image resolution results, in accordance with one embodiment.
Figure 2G:
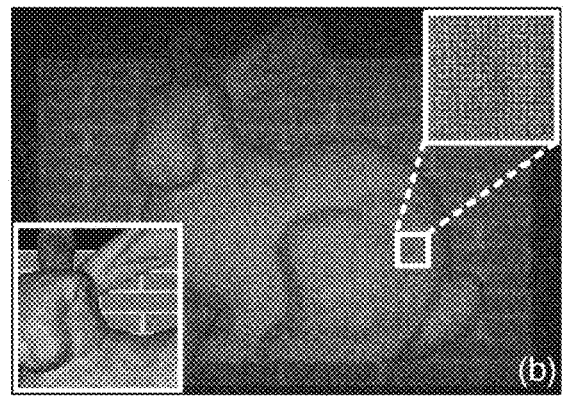
Figure 2G:
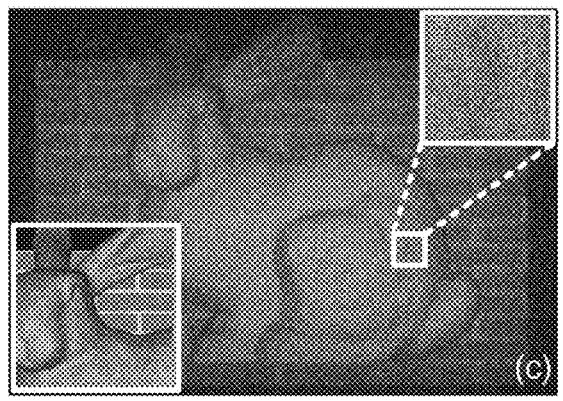
Figure 2G:
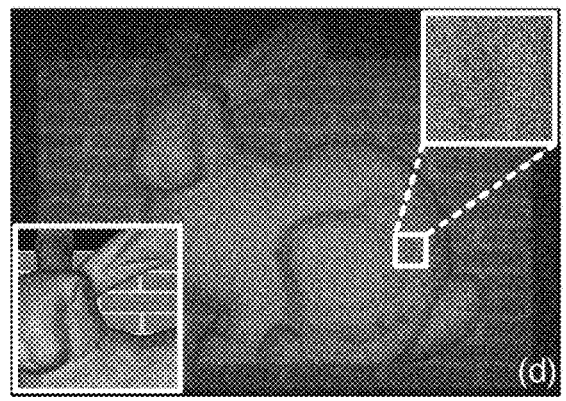

FIG. 2G illustrates a comparison of elemental image resolution results, in accordance with one embodiment. Angular sampling rate (pixels per observed degree) is varied, with image (a) having an angular sampling rate of 6, image (b) having an angular sampling rate of 18, image (c) having an angular sampling rate of 30, and image (d) having an angular sampling rate of 45. An inset (bottom left) of each image depicts the rendered elemental image of resolution varying resolution having a corresponding angular sampling rate, while a detail (top right) illustrates reconstructions at the corresponding angular sampling rate. Lower resolution reconstructions (top row of images) exhibits obvious aliasing; however, higher resolution reconstructions (bottom row of images) is smooth in appearance, without obvious signs of aliasing. In general, an angular sampling rate above 30 pixels per degree provides a good approximation with little noticeable aliasing. Consequently, in one embodiment, an angular sampling rate above 30 pixels per degree is implemented.

Although a small hogel size ($w_h$) and dense partitioning increases the number of rendered views needed, a smaller hogel size also reduces ambiguity regions and produces more accurate perspectives for intra-ocular occlusion. A balance may be achieved between competing parameters by evaluating hogel size based on a ratio between error-free segment and approximated sliding window. In one embodiment the SLM includes a resolution of 3840×2160 and, $w_h \approx 1$ mm. This configuration may produce an ambiguity region of less than 0.16% for a two-dimensional view with 16×9 hogel partitioning. Note that larger pixel pitch may require denser hogel partitioning.

Figure 2H:
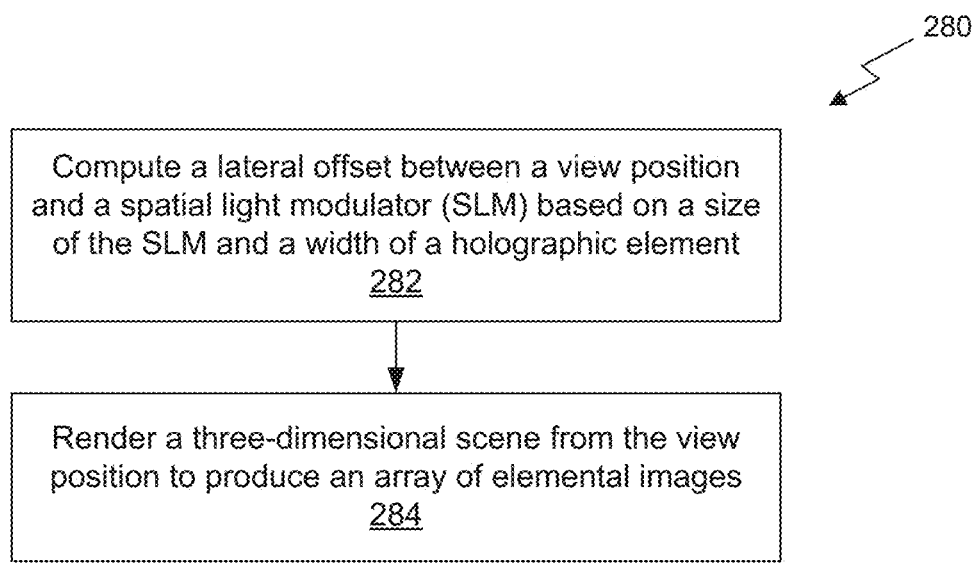
FIG. 2H illustrates a flowchart of a method for rendering a light field, in accordance with one embodiment.

FIG. 2H illustrates a flowchart of a method 280 for rendering a light field, in accordance with one embodiment. Although method 280 is described in the context of a processing unit, the method 280 may also be performed by a program, custom circuitry, or by a combination of custom circuitry and a program. For example, the method 280 may be executed by a GPU, a CPU, or any other technically feasible processor. Furthermore, persons of ordinary skill in the art will understand that any system that performs method 280 is within the scope and spirit of embodiments of the present invention.

At step 282, the processing unit computes a lateral offset (e.g., $d_{CZ}$) between a view position and an SLM (e.g., SLM 223, SLM 263) based on a size of the SLM and a width of a holographic element (hogel). In one embodiment, the view position specifies a view position for a virtual camera (e.g., virtual camera 230, virtual camera 260). Furthermore, in one embodiment, an array of hogels covers a surface of the SLM. At step 284, the processing unit renders a three-dimensional scene from the view position to produce an elemental image included within an array of elemental images. The processing unit may render each elemental image within the array of elemental images. In one embodiment, the array of elemental images includes a corresponding array of depth maps (e.g., rendered along with the elemental images). A phase map and an amplitude map are then computed from the elemental images and depth maps, as depicted in FIG. 1D. The phase map and amplitude map may be partitioned to form a one-to-one mapping to the array of hogels. Any technically feasible technique may be implemented to compute the phase map and the amplitude map.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 3:
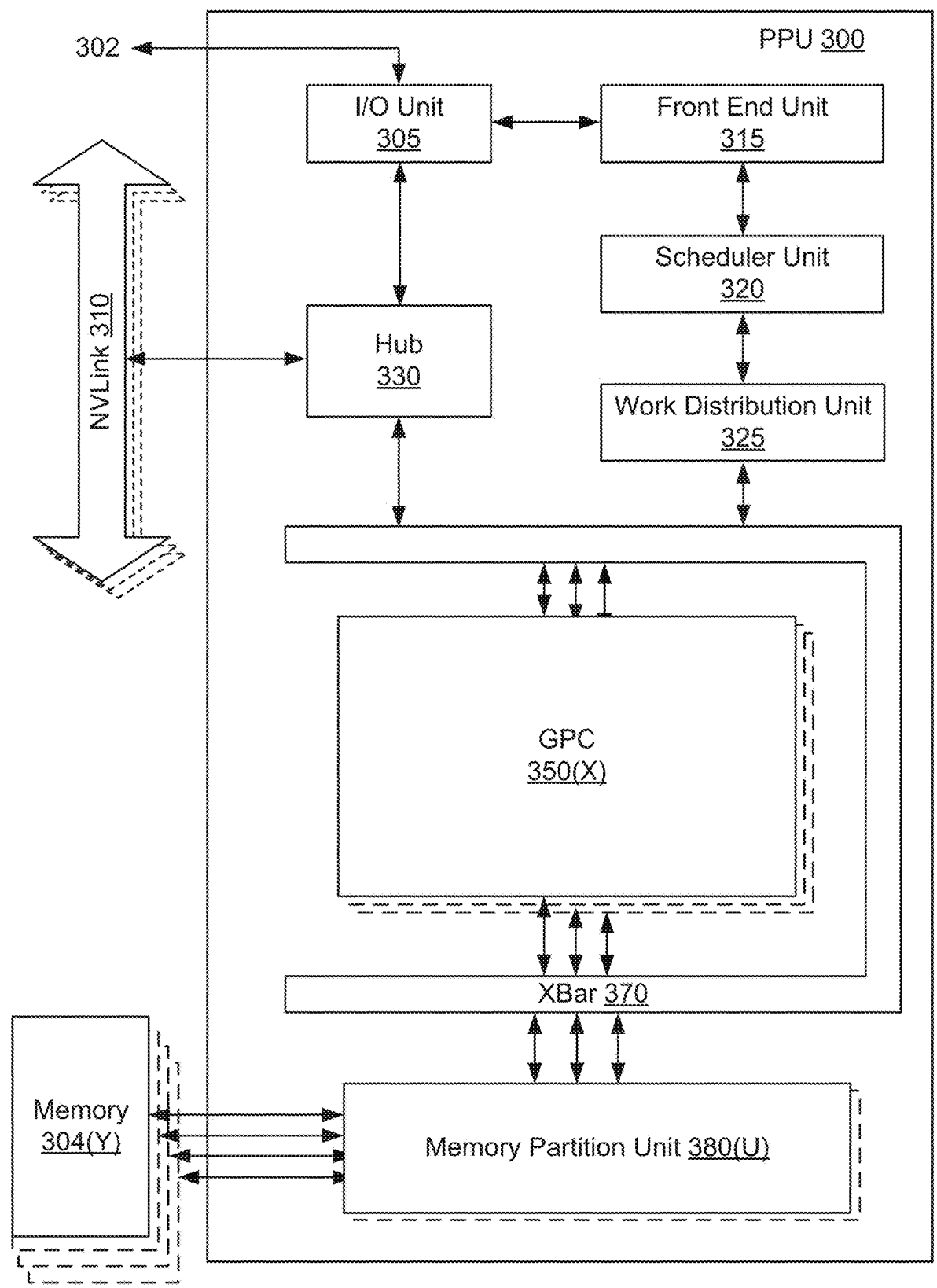
FIG. 3 illustrates a parallel processing unit, in accordance with one embodiment.

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the interconnect 302 via memory requests transmitted over the interconnect 302 by the I/O unit 305. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
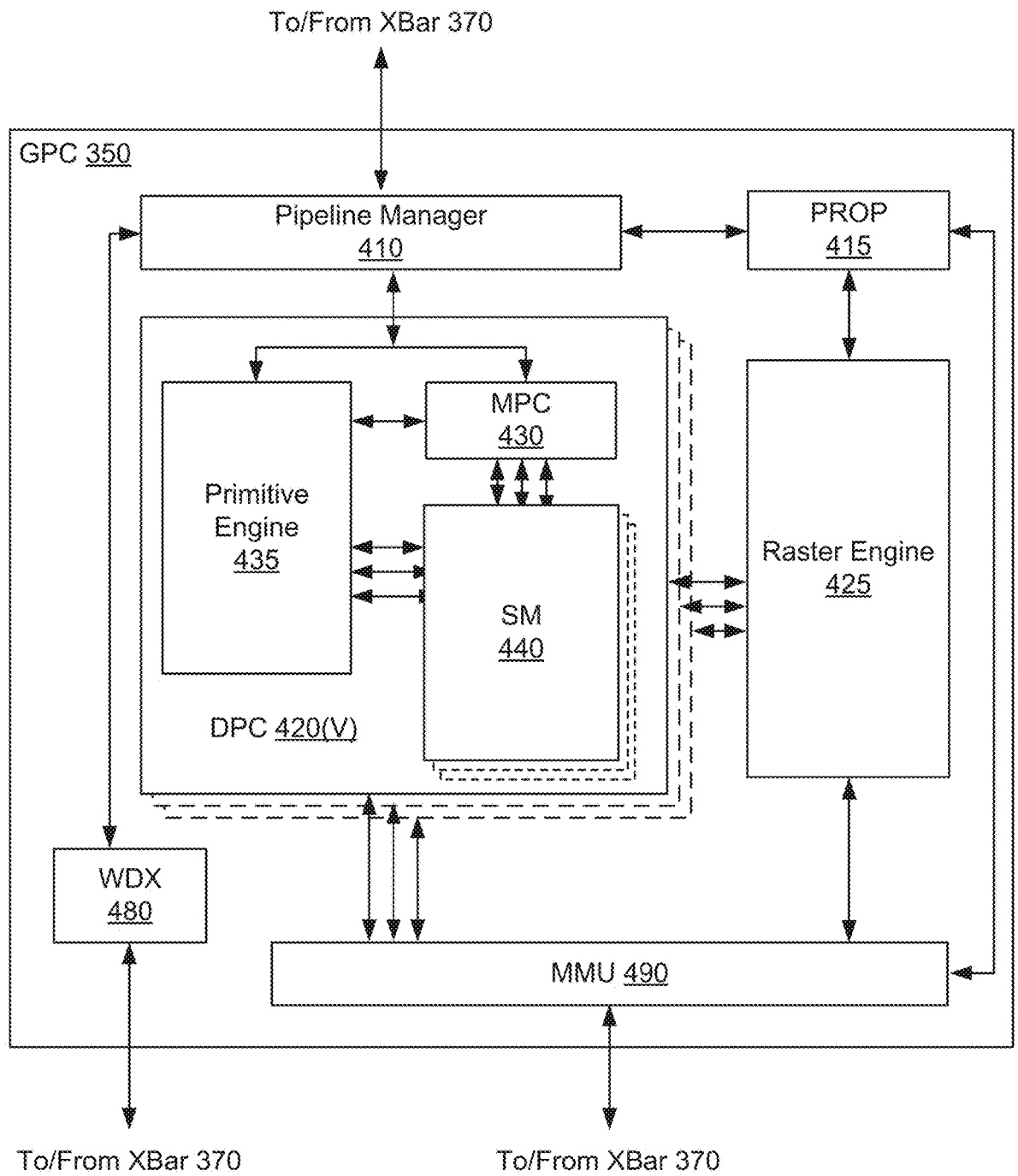
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
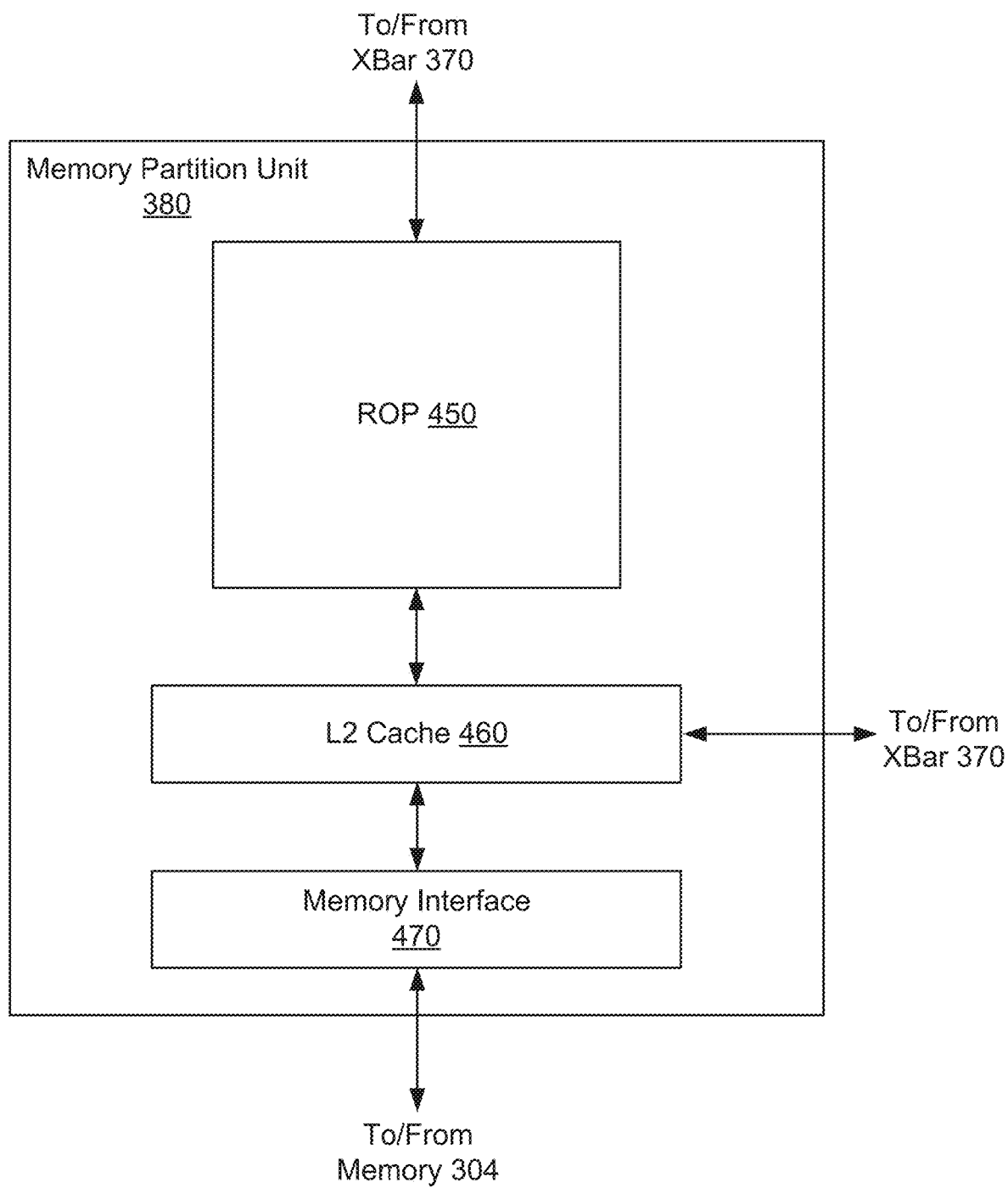
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit in the partition unit 380, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory (GDDR5 SDRAM).

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370.

Figure 5A:
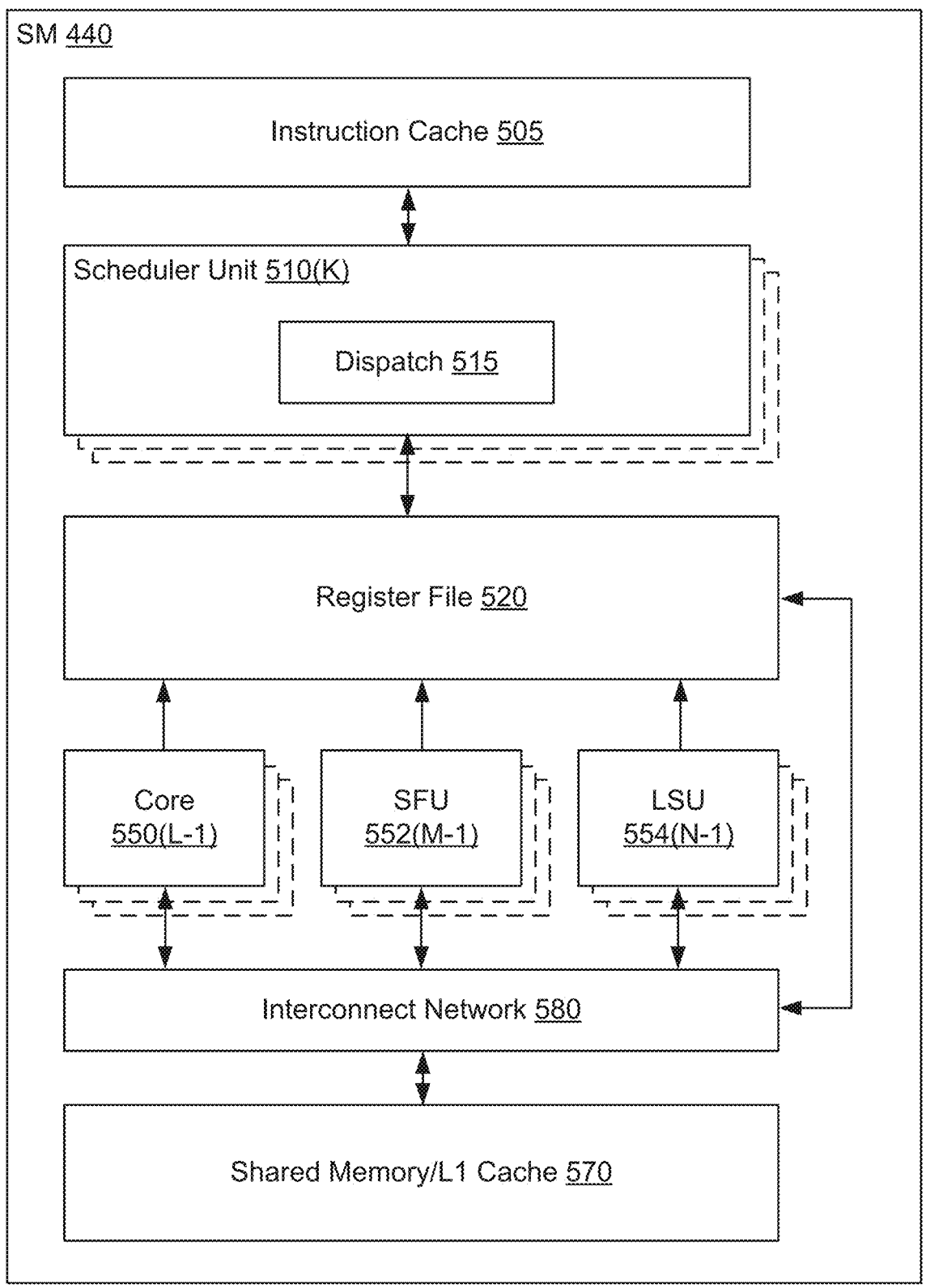
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation $D=A\times B+C$, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
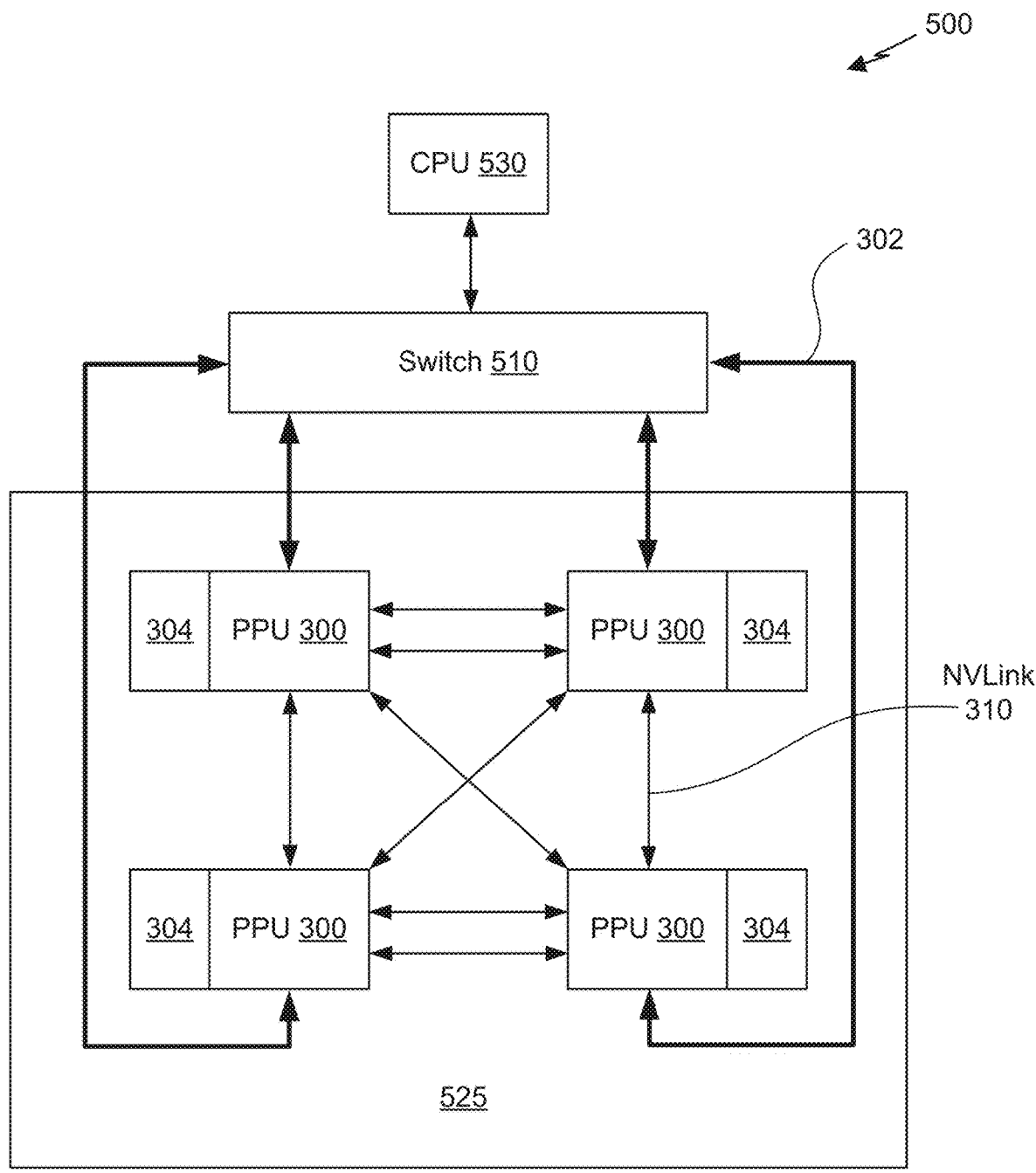
FIG. 5B is a conceptual diagram of a processing system implemented using the PPU of FIG. 3, in accordance with one embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with one embodiment. The processing system 500 may be configured to implement the method 110 shown in FIG. 1A, the method 120 shown in FIG. 1B, the method 280 shown in FIG. 2H, or any combination thereof. The processing system 500 includes a CPU 530, switch 510, and multiple PPUs 300 each and respective memories 304. The NVLink 310 provides a high-speed communication links between each of the PPUs 300. The switch 510 interfaces between the interconnect 302 and the CPU 530. The PPUs 300, memories 304, and NVLinks 310 may be situated on a single semiconductor platform to form a parallel processing module 525.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
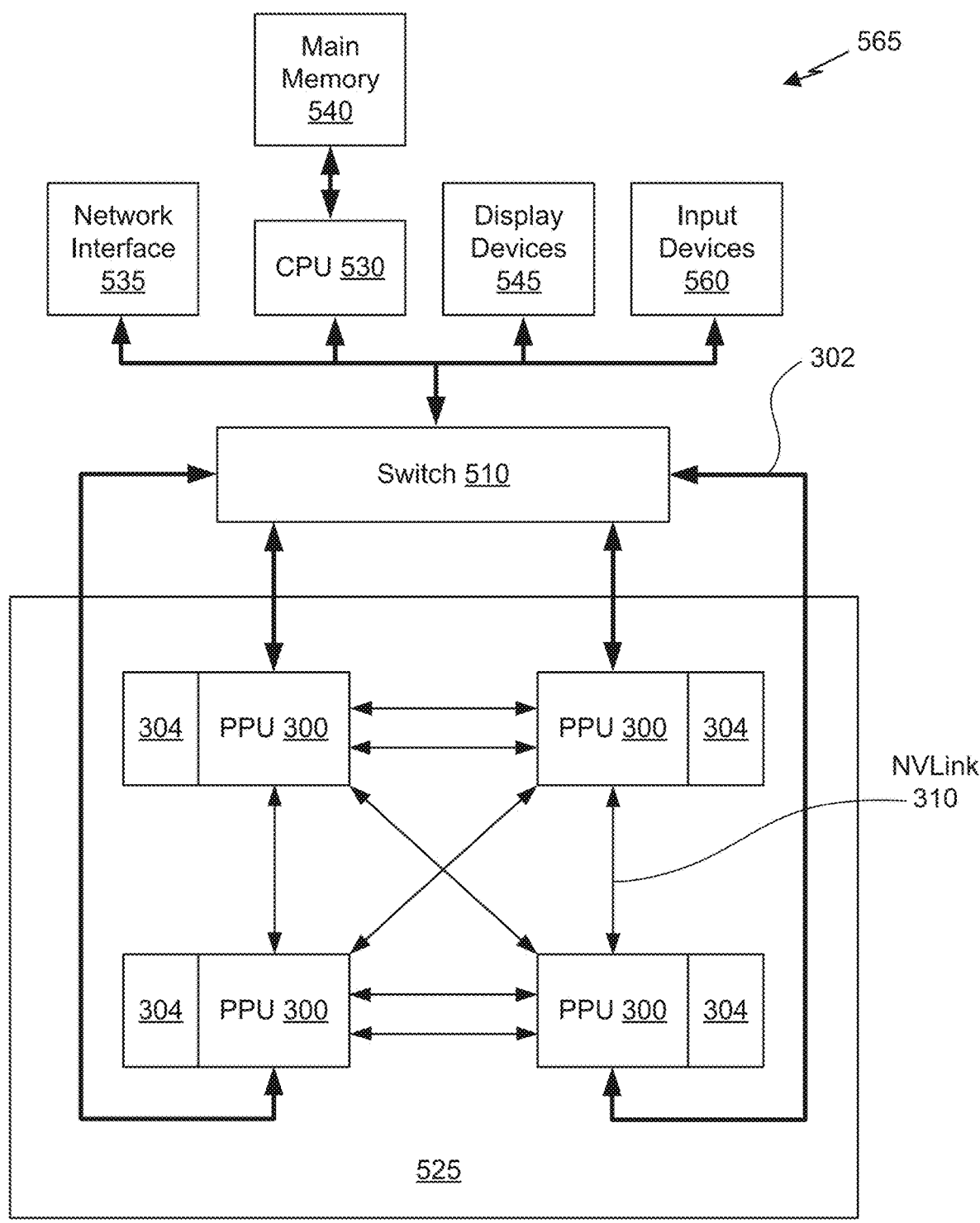
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 110 shown in FIG. 1A, the method 120 shown in FIG. 1B, the method 280 shown in FIG. 2H, or any combination thereof.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display). In one embodiment, phase and amplitude samples for pixels of an SLM (e.g., SLM 263 in FIG. 2D) are rendered by the GPU, according to the techniques discussed herein. In particular, 3D scene information comprising geometric, vertex, and/or fragment primitives may be rendered by the GPU to generate fragments associated with different scene objects. View-dependent effects may be performed using the 3D rendering pipeline z-buffer. In one embodiment, the fragments may be generated in parallel by one or more instances of PPU 300 within the GPU. Furthermore, an array of elemental images may be rendered according to computed virtual camera views for the 3D scene, and the elemental images are used to then compute corresponding hogels. A holographic light field frame comprising an array of hogels is presented to a viewer by the SLM. A time sequence of light field frames rendered by the GPU and displayed by the SLM may provide the viewer with an experience of seeing actual 3D objects in the 3D scene, with appropriate view-dependent occlusion, continuous focus cues, and real-time response based on specific application scene information (e.g., model data and virtual camera position data).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
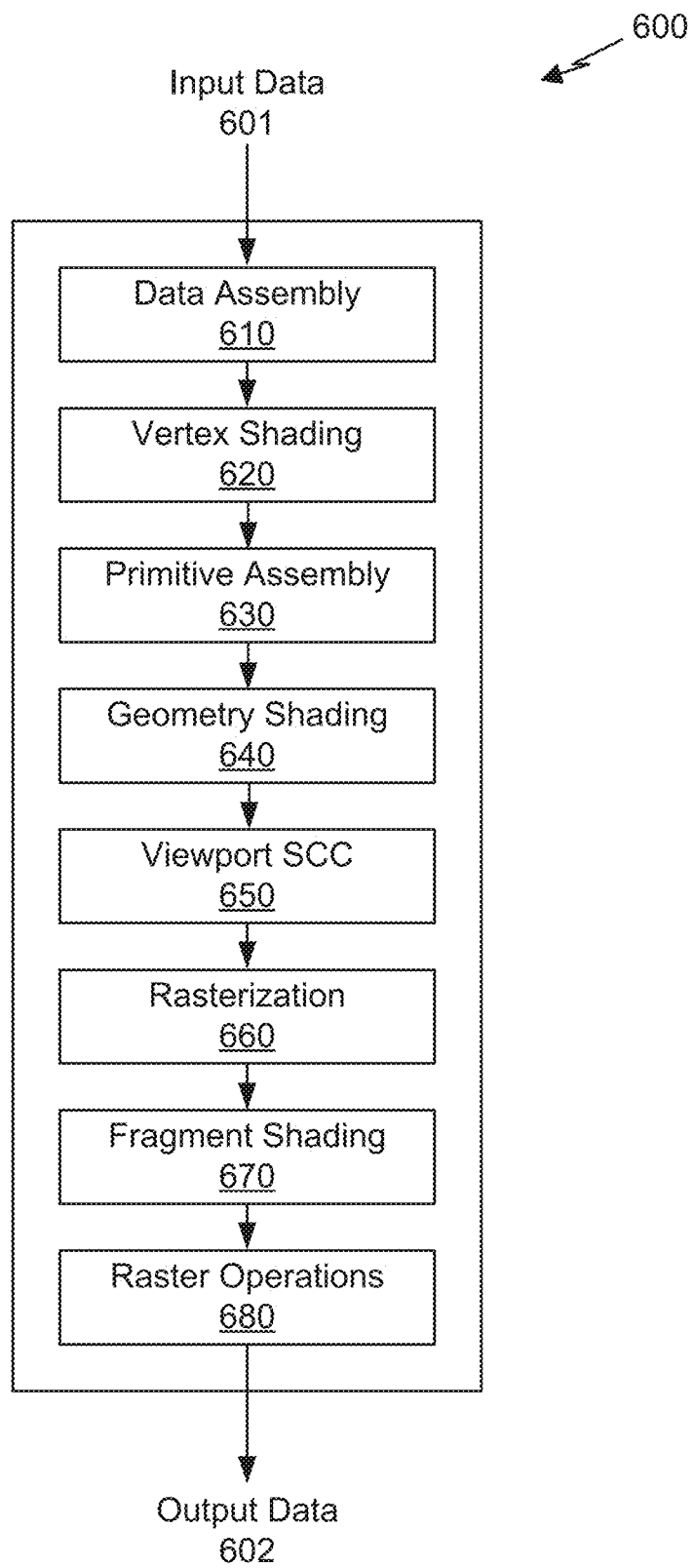
FIG. 6 is a conceptual diagram of a graphics processing pipeline implemented by the PPU of FIG. 3, in accordance with one embodiment.

FIG. 6 is a conceptual diagram of a graphics processing pipeline 600 implemented by the PPU 300 of FIG. 3, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 440 of the PPU 300.

The graphics processing pipeline 600 may be implemented via an application executed by a host processor, such as a CPU. In one embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In one embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A method for rendering a light field that comprises a plurality of elemental images arranged in a grid, the method comprising:
generating, by a processor, for each elemental image of the plurality of elemental images, components of the light field corresponding to that elemental image by:
projecting rays from a viewpoint positioned at a lateral offset from a first side of a spatial light modulator (SLM) to form an elemental view frustum within a three-dimensional scene; and
rendering objects within the elemental view frustum to generate components of the elemental image,
wherein each elemental image of the plurality of elemental images corresponds to a holographic element (hogel) associated with one or more picture elements (pixels) of the SLM, and wherein the SLM is divided into a plurality of hogels having size $w_h$ and the lateral offset is calculated based on the size $w_h$.

2. The method of claim 1, wherein the rendering comprises, for each pixel of the hogel corresponding to the elemental image:
projecting second rays from the pixel to a clipping plane to define a pixel diffraction cone having a base of a first width; and
removing a portion of the components of the elemental image outside of the pixel diffraction cone.

3. The method of claim 1, wherein the components include a color and a position in three-dimensional (3D) space.

4. The method of claim 1, wherein the components include a phase and an amplitude.

5. The method of claim 4, further comprising computing the phase and the amplitude as a product of an object wave and a conjugate reference wave corresponding to a plane wave illumination source.

6. The method of claim 4, further comprising computing the phase and the amplitude as a product of an object wave and a conjugate reference wave corresponding to a spherical wave illumination source.

7. A method for rendering a light field that comprises a plurality of elemental images arranged in a grid, the method comprising:
computing, by a processor, a lateral offset based on a size $w_h$ of a holographic element (hogel) associated with a spatial light modulator (SLM), a pixel pitch of the SLM, and a wavelength associated with a monochromatic light source, wherein the SLM is divided into a plurality of hogels, each hogel associated with one or more picture elements (pixels) of the SLM; and
for each elemental image, rendering, by the processor, a three-dimensional scene from a viewpoint located at the lateral offset from a first side of the SLM to produce components of the elemental image, wherein each elemental image is associated with a different viewpoint.

8. The method of claim 7, wherein the rendering comprises computing a color array and a depth array for at least one elemental image of the plurality of elemental images.

9. The method of claim 8, further comprising: calculating a phase value for a pixel of the SLM based on at least one depth value of the depth array.

10. The method of claim 8, further comprising: calculating an amplitude value for a pixel of the SLM based on at least a corresponding color value of the color array.

11. The method of claim 7, further comprising computing a phase and an amplitude for a pixel of the SLM as a product of an object wave and a conjugate reference wave corresponding to a spherical illumination source.

12. The method of claim 7, wherein the rendering comprises, for each pixel of the hogel corresponding to the elemental image:
projecting rays from the pixel to a clipping plane to define a pixel diffraction cone having a base of a first width.

13. The method of claim 12, wherein the rendering further comprises removing a portion of the components of the elemental image outside of the pixel diffraction cone.

14. A system for rendering a light field that comprises a plurality of elemental images arranged in a grid, the system comprising:
a spatial light modulator (SLM) divided into a plurality of holographic elements (hogels) having size $w_h$, each hogel associated with one or more picture elements (pixels) of the SLM, and each elemental image of the plurality of elemental images corresponding to a particular hogel of the plurality of hogels; and
a processor coupled to the SLM and configured to:
generate, for each elemental image of the plurality of elemental images, components of the light field corresponding to that elemental image by:
projecting rays from a viewpoint positioned at a lateral offset from a first side of a spatial light modulator (SLM) to form an elemental view frustum within a three-dimensional scene, wherein the lateral offset is calculated based on the size $w_h$; and
rendering objects within the elemental view frustum to generate components of the elemental image.

15. The system of claim 14, wherein the rendering comprises, for each pixel of the hogel corresponding to the elemental image:
projecting second rays from the pixel to a clipping plane to define a pixel diffraction cone having a base of a first width; and
removing a portion of the components of the elemental image outside of the pixel diffraction cone.

16. The system of claim 14, wherein the components include a color and a position in three-dimensional (3D) space.

17. The system of claim 14, wherein the components include a phase and an amplitude.

18. The system of claim 17, further comprising computing the phase and the amplitude as a product of an object wave and a conjugate reference wave corresponding to a plane wave illumination source.

19. The system of claim 17, further comprising computing the phase and the amplitude as a product of an object wave and a conjugate reference wave corresponding to a spherical wave illumination source.

20. The system of claim 14, wherein the processor comprises a graphics processing unit.

* * * * *